Figure 1:
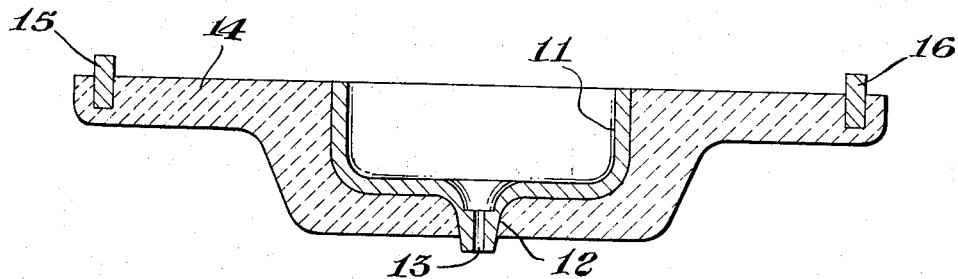

Oct. 31, 1967

M. J. HUNTER ET AL 3,350,182

SILICON CARBIDE GLASS FIBER BUSHING AND
METHOD OF MAKING SAID BUSHING
Filed July 29, 1965

INVENTORS.
Melvin J. Hunter
Edward L. Kern
Dennis W. Hamill
BY
ATTORNEY

United States Patent Office 3,350,182
Patented Oct. 31, 1967

3,350,182
SILICON CARBIDE GLASS FIBER BUSHING AND
METHOD OF MAKING SAID BUSHING
Melvin J. Hunter, Edward L. Kern, and Dennis W. Hamill,
all of Midland, Mich., assignors to Dow Corning Corporation, Midland, Mich., a corporation of Michigan
Filed July 29, 1965, Ser. No. 475,674
5 Claims. (Cl. 65—1)

The present invention relates to bushings or crucibles for forming glass fibers and more particularly to improved structures for forming glass fibers and to methods of making such structures.

It has heretofore been common practice in the art of forming glass fibers to utilize crucibles, or "bushings," made of platinum. The bushing is generally cup-shaped with a plurality of holes (usually 204) provided in the bottom thereof. The bushing is placed in a heating fixture with its bottom exposed and balls or "marbles" of glass are placed in the bushing and heated until the glass is molten, or molten glass is poured into the bushing, and flows through the holes, forming gobs from which fibers are pulled at high speed. The glass is commonly a lime-aluminum-borosilicate glass which is relatively soda-free and forms filaments having a diameter of from about 0.00020 inch to 0.00075 inch and larger, depending on pulling speed, molten glass temperature, orifice size, and other variables.

Platinum is generally used to form the bushing because of its ability to withstand the temperatures necessary to contain most types of molten glass and its chemical stability with respect to the glass and oxygen in the ambient air at these temperatures. Platinum is, however, very expensive and is relatively ductile and soft, requiring frequent reworking. Furthermore, it is not capable of withstanding the temperatures necessary for drawing certain types of high temperature glasses.

It is an object of the present invention to provide a bushing for glass fibers which is more economical to fabricate and maintain than prior art devices for the same purpose.

Another object is to provide a glass fiber drawing bushing which has higher temperature capabilities than presently known bushings.

A further object is to provide an improved bushing for drawing glass fibers and a method of making the improved bushing.

In accordance with these and other objects there is provided in accordance with the present invention an improved bushing composed entirely of homogeneous silicon carbide, or alternatively, having at least a glass-confining surface consisting of dense, homogeneous silicon carbide. Silicon carbide has been found to be chemically inert with respect to molten glass and does not oxidize even at the temperatures connected with molten high temperature glass. It is further, physically capable of withstanding these temperatures without excessive deformation and is extremely hard, thereby retaining its initial shape much longer than prior art materials.

Figure 2:
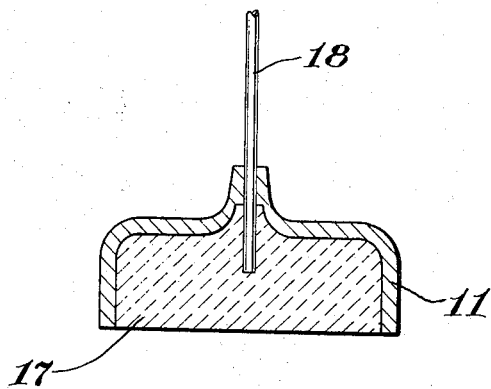

Other objects and attendant advantages of the present invention will become obvious to those skilled in the art as the invention becomes better understood by reference to the following detailed description when considered in connection with the accompanying drawings wherein:

FIG. 1 is a cross-sectional view of a bushing made in accordance with the present invention, shown in place in a resistance heater; and FIG. 2 is a cross-sectional view illustrating a method of fabrication of the bushing of FIG. 1.

Referring now to the drawings wherein like reference numerals designate like or corresponding parts throughout the several views, there is shown in FIG. 1 a solid silicon carbide bushing 11 having a nozzle 12 in the bottom thereof, the nozzle having a hole 13 therethrough. Although only one nozzle and hole has been shown in the drawing, it will be understood that the provision of a plurality of holes in the bottom of the bushing is common practice in the art, and that only one hole has been shown merely for the sake of simplicity in understanding the invention. The precise shape of the bushing is also a matter of design and it is to be understood that the shape shown is merely exemplary and that within the knowledge of those skilled in the art the bushing may have any desired configuration. While it is possible to pull fibers from a bushing having a relatively flat bottom the provision of the projecting nozzles is much preferred since the gob of glass at the hole tends to spread out as it leaves the hole and stick to the bottom of the bushing unless a projection is used.

The bushing 11 is shown mounted in a resistance heating element 14 having a pair of electrical connectors 15, 16 affixed thereto. For use of the bushing a plurality of marbles, or ball-shaped bodies of the glass to be formed into fibers are placed into the bushing 11, and the heating element 14 is connected to a source of electrical power by means of the connectors 15, 16. The electrical power applied is preferably thermostatically controlled to heat the glass until it becomes molten and maintain it at that tempearture as is known in the art. Alternatively, molten glass may be poured into the bushing and the heating element needs only to hold it at molten temperatures. The molten glass flows slowly due to gravity out of the hole 13 and forms a gob on the end of the nozzle 12 from which fibers are pulled in accordance with conventional techniques. The diameter of the fiber is controlled by the pulling speed and is also determined by the size of the hole, the temperature, and the type of glass as is known in the art.

The bushing 11 in accordance with the present invention is made of homogeneous silicon carbide. It may be formed, for example, as shown in FIG. 2 as a layer upon a shaped substrate block 17 of graphite which has a tantalum wire 18 embedded therein to form the nozzle opening. The block 17 with the wire 18 embedded therein is placed in a reaction chamber and a homogeneous layer of dense silicon carbide is pyrolytically deposited over the surface of the block. Methods for pyrolytically depositing silicon carbide are known in the art. For example, the silicon carbide may be formed by reduction of alkylsilanes such as dimethyldichlorosilane with a gas such as hydrogen at temperatures between 1150° C. and 1250° C. This has been accomplished in a reaction chamber using a total hydrogen flow of up to 10 liters per minute made up of a ratio of between 20:1 to 1:1 $H_2$ to dimethyldichlorosilane. Other silanes such as trimethylmonochlorosilane, propyltrichlorosilane, and various mixtures including monomethyl- and dimethyltrichlorosilanes may also be used, as may mixtures of gaseous silicon compounds and gaseous carbon compounds.

Other substrates may be used in place of the carbon or tantalum provided they are capable of withstanding the temperatures involved and have a thermal coefficient of expansion approximating that of silicon carbide so that no undue strain is placed on the SiC layer. The shape of the substrate may be varied as desired.

After deposition is completed, the graphite may be burned out or etched away and the tantalum wire is also etched away leaving the bushing 11 for use as shown in FIG. 1. Instead of using the tantalum wire to provide the hole 13 in the bushing, the bushing may be deposited on a substrate and holes cut therein by means such as a diamond drill or electron discharge machining. Instead of forming a bushing to fit the inside surfaces of the heating element 14, the silicon carbide bushing may be formed as an integral part of the heating element by deposition directly on the graphite which is adapted to be connected into the electrical circuit for heating. Alternatively, it is also possible to use the silicon carbide as a heating element as well as a bushing by doping the silicon carbide to the desired resistivity as it is deposited.

Various other modifications and variations of the invention will become obvious to those skilled in the art. It is to be understood, therefore, that, within the scope of the appended claims, the invention may be practiced otherwise than as specifically described.

That which is claimed is:

1. A bushing for use in drawing glass filaments, the internal surface of said bushing consisting of silicon carbide.

2. Apparatus for use in drawing glass filaments comprising:
    an electrically resistive heating element adapted to be connected to an electrical power source, and
    at least one recess in said heating element having at least one aperture in the bottom thereof;
    the surface of said recess consisting of silicon carbide.

3. Apparatus as defined in claim 2 wherein said aperture in the bottom of said recess extends through a nozzle portion projecting beyond the bottom of the main portion of said heating element.

4. A method of making a bushing for use in drawing glass fibers comprising the steps of:
    forming a substrate block to the desired configuration of the internal surface of the bushing,
    inserting at least one wire in the block in position to conform with the preselected location of an aperture in the bottom of said bushing,
    coating said block and wire with pyrolytically deposited silicon carbide, and
    removing the substrate block and wire from the deposited silicon carbide.

5. A method of making a bushing for use in drawing glass fibers comprising the steps of.
    forming a substrate block to the desired configuration of the surface of the bushing,
    coating said block with a homogeneous layer of pyrolytically deposited silicon carbide, and
    providing at least one hole through said coating.

References Cited

UNITED STATES PATENTS

| | | | |
|---|---|---|---|
| 2,440,187 | 4/1948 | Silverberg | 65—374 X |
| 2,814,657 | 11/1957 | Labino | 65—1 X |
| 2,978,358 | 4/1961 | Campbell | 23—208 X |
| 2,996,783 | 8/1961 | Mayer | 23—208 X |
| 3,079,273 | 2/1963 | Johnson | 23—208 X |
| 3,245,674 | 4/1966 | Baer et al. | 65—374 X |
| 3,248,190 | 4/1966 | Woodward et al. | 65—1 |

DONALL H. SYLVESTER, *Primary Examiner.*

R. LINDSAY, *Assistant Examiner.*